United States Patent

[11] 3,622,355

| [72] | Inventors | Roderick G. Beck; Mounir A. Shatila, both of Blackfoot, Idaho |
|---|---|---|
| [21] | Appl. No. | 814,519 |
| [22] | Filed | Apr. 7, 1969 |
| [45] | Patented | Nov. 23, 1971 |
| [73] | Assignee | American Potato Company San Francisco, Calif. |

[54] AGGLOMERATED DEHYDRATED POTATO PRODUCT AND PROCESS
3 Claims, No Drawings

[52] U.S. Cl. ..................................... 99/207, 99/104
[51] Int. Cl. ..................................... A23b 7/02, A23b 7/03
[50] Field of Search ........................... 99/100, 100 P, 199, 207, 246, 104

[56] References Cited
UNITED STATES PATENTS

| 3,021,224 | 2/1962 | Stagmeier | 99/207 |
| 3,039,883 | 6/1962 | Kodras | 99/100 P |
| 3,063,849 | 11/1962 | Nelson et al. | 99/207 |
| 3,260,607 | 7/1966 | Asselbergs et al. | 99/207 |
| 3,282,704 | 11/1966 | Fritgberg | 99/100 |
| 3,396,036 | 8/1968 | Liepa | 99/100 P |
| 3,297,450 | 1/1967 | Loska, Jr. | 99/100 |
| 3,338,724 | 8/1967 | Adler et al. | 99/207 |
| 3,407,080 | 10/1968 | Rainwater et al. | 99/207 |
| 3,457,088 | 7/1969 | Beck et al. | 99/207 |
| 3,458,325 | 7/1969 | Beck et al. | 99/207 |

FOREIGN PATENTS

| 925,888 | 5/1963 | Great Britain | 99/207 |

Primary Examiner—Norman Yudkoff
Assistant Examiner—Martin G. Mullen
Attorney—Townsend and Townsend

ABSTRACT: An agglomerate of dehydrated potato particles that is reconstitutable without agitation to form a substantially homogenous dough even when disposed as a consolidated mass. The reconstituted potato dough exhibits uniform cohesive characteristics that allow for ready division into shapes suitable for french frying.

AGGLOMERATED DEHYDRATED POTATO PRODUCT AND PROCESS

BACKGROUND OF THE INVENTION

1. Field of the Invention

This invention relates to the production of agglomerates of potato particles that are adapted to be rehydrated without mixing into a homogenous dough that can be readily divided into shaped corresponding to that of conventional french fries.

2. Description of the Prior Art

The prior art contains a number of products composed primarily of dehydrated potato solids that are reconstitutable to a dough that is suitable for forming into shapes for subsequent deep fat frying. Typical of these are British Pat. No. 608,996 and U.S. Pat. No. 3,396,036, issued Aug. 6, 1968. In such prior art patents, dehydrated potato solids composed essentially of intact potato cells, and known in the art as "granules" (such as those commonly prepared by the conventional add-back process), or "flakes" (such as those prepared by drum drying techniques), are combined with a binder (adhesive) and water to produce a doughlike mass adapted to be formed into segments of desired dimensions for deep fat frying (french frying). Granules and flakes rapidly absorb water, a characteristic that does not pose a serious problem when reconstituting to mashed potatoes because such products require about five parts liquid to one part dry product, by weight, a ratio of liquid that allows all the particles to become wetted before the mass thickens. However, suitable dough for french fry use can utilize between 1½ to 2½ parts by weight of reconstitution liquid to one part dry product. When reconstitution is attempted under such conditions, the aforementioned physical forms of potato solids require extensive and vigorous mixing (agitation) to ensure that the reconstituting liquid (usually water) will be evenly distributed through the solids, before swelling occurs, i.e., so that uniform rehydration will be accomplished. If mixing is not employed, the dehydrated particles first contacted by the liquid are converted to a thickened dough, thereby preventing further migration of water, with the result that dry areas or insufficiently rehydrated areas are created in proximity to areas which contain relatively too much water.

This rehydration characteristic of granules and flakes is particularly detrimental where automation in the preparation of french fries requires generally "in-place" rehydration, such as is described in copending, commonly assigned U.S. Pat. application (Townsend and Townsend File No. 4025-3). Under circumstances such as illustrated in that application, it is essential that the dehydrated potato product uniformly reconstitute to a homogenous doughlike mass in the substantially complete absence of mixing or agitation. While it may be possible to reconstitute dehydrated potato solids, whether they be granules or flakes, to a thickened dough without mixing by arranging the solids in a sufficiently thin layer, it is obvious that such an approach would not be commercially practical.

In U.S. Pat No. 3,021,224, it is suggested that preswelled potato granules, be agglomerated by combining the granules with 70–85 percent moisture by total weight, shaping the rehydrated potato mash into filaments or shreds and redehydrating to commercial dryness. The resulting product is readily reconstitutable to mashed potatoes with improved texture and flavor. However, this type of product, even when modified with a prior art binder (or adhesive), does not exhibit all the physical characteristics necessary for the nonagitated rehydration to a doughlike mass satisfactory for shaping into bodies suitable for french frying.

SUMMARY OF THE INVENTION

Broadly, the present invention is directed to "agglomerates" of potato particles, formed largely of individual potato cells, that are capable of rapid rehydration into a substantially uniform homogenous dough in the absence of physical agitation (or mixing), even when disposed as a relatively thick mass. More specifically, this nonagitated reconstitution can be accomplished merely by subjecting the mass to the desired amount of liquid by allowing the liquid to flow by gravity into and along at least one surface of the mass of agglomerates. The term "rapid rehydration" is intended to mean rehydration to a uniform, cohesive, but not sticky doughlike mass, within as little as 20 seconds of the introduction of the rehydrating liquid but within as long as 15 minutes. The term "relatively thick" mass is intended to define a consolidated body of agglomerates having each dimension greater that one-fourth inch, preferably formed by the gravitational flow of the agglomerates in an at least partially enclosed container.

It has now been found that by providing an agglomerate of dehydrated potato particles having a unique, unobvious correlation between the properties of bulk density, bulk porosity and rate of moisture absorption, a relatively consolidated mass of these agglomerates can be reconstituted with the aforementioned range of 1.5 to 2.5 parts of water per part of agglomerates, in the absence of or at least without significant agitation (or stirring), and within the desired time period. In the preferred aspect, it has now been found that when agglomerates possessing a bulk density of from 0.25 to 0.50 grams per milliliter, a bulk porosity in volume of voids to volume of particles of 0.6 to 0.9, and a moisture absorption rate of at least about 0.12 grams of water per gram of product per second, are reconstituted without mixing, the resulting dehydrated doughlike mass is particularly suitable for shaping into french fry bodies.

In still another aspect, a minor amount of binder such as guar gum has been found to be essential to the preparation of a suitable dough. Of course, one skilled in this art will appreciate that other binders can be incorporated, or that the processing conditions for the potato solids can be modified to provide sufficient free starch to produce the necessary binding characteristics.

The term "bulk density" means the weight of agglomerates per unit volume.

The term "bulk porosity" means the void volume (defined as voids between the agglomerates plus the voids available within the agglomerates) per agglomerate volume.

Ideally, the volume of voids within the consolidated mass of agglomerates should conform to the volume of moisture to be used for reconstitution.

A determination of "bulk porosity" as defined above was made as follows:

1. Ten grams of agglomerates were poured into a graduated glass cylinder and found to have a volume of 25 milliliters.
2. Sixty milliliters of carbon tetrachloride were poured over the agglomerates in the cylinder and allowed to stand until air bubbles no longer rose to the surface. The total volume of carbon tetrachloride and submerged agglomerates was found to be 67 milliliters.
3. Bulk porosity was calculated from these data, thus:

$$\frac{\text{Volume of available voids } (25-7)}{\text{Total volume}} = \frac{18}{25}$$

$$= .72 \text{ bulk porosity}$$

The term "rate of moisture absorption" is defined as the speed at which the potato particles forming the agglomerates absorb water. Should this rate be too fast, the particles first contacted by the reconstituting liquid will absorb a disproportionate quantity of water. Should the rate be too slow, the particles will not attain the desired degree of rehydration within the prescribed time interval, and as a result, the finished dough will be a succession of watery areas, which were originally the voids, and heavy areas, with dry centers, which were originally the location of the dry agglomerates. Ideally, the rate of absorption should be such that the rehydrating liquid will flow into all of the void areas in the consolidated mass before substantial swelling occurs. Suitable absorption rates, in terms of weight of water absorbed per dry weight of agglomerates, are in the range of the aforementioned 0.12 to about 0.50 grams of water per gram of product per second.

Although it is intended that the reconstituting liquid be added practically instantaneously, when the moisture absorption rate is substantially above 0.50 grams/gram/second, the water cannot be readily introduced at a rate fast enough to prevent nonuniform rehydration. Preferably the agglomerates have an initial absorption rate in the range of 0.20 to 0.35 grams of water per gram of product per second.

The determination of agglomerate moisture absorption rate was accomplished as follows. To 5 gram increments of dry agglomerates in a shallow pan, was added an excess of water, i.e., 25 milliliters of water. Tests were conducted with water temperatures of 70° F. and 130° F. After about 10 seconds, the excess water was poured off and measured. The total amount absorbed was corrected for the time interval and quantity of agglomerates, and reduced to grams of water absorbed per gram of product per second. Satisfactory agglomerates exhibited a rate at least equivalent to 0.12 when reconstituted in water at 130° F.

The novel product of this invention can be formed by any method that will produce the desired characteristics for the agglomerate. Included among suitable forming processes are spraying an agglomerating liquid onto a heated fluidized bed of granules or low-pressure forming (extrusion) and subsequent drying of a moist mass of potato particles. A satisfactory mix for extrusion has been found to result from mixing four parts by weight of potato granules with sufficient freshly cooked potatoes to supply one additional part by weight of potato solid matter. The low-pressure extrusion process is preferable, and for convenience of discussion, the remainder of this disclosure will be directed to processing of this type. Furthermore, reference will hereinafter be made to the term "potato particles," which is intended to include the individual potato cells and groups of substantially intact potato cells as in commercial granules, as well as, under certain conditions, finely divided flakes.

Starting with dehydrated potato granules, they are first combined with sufficient moisture and binder to provide a damp adhesive mix. The preferred amount of moisture has been found to be from 35–55 percent by total weight of adhesive mix when water at about 60° F. is utilized. With moisture concentrations substantially above 55 percent and even in the range of 70 percent, the extruded pieces, when dried, exhibit decreased porosity, and a hard shell-like surface with greatly reduced water absorption power, unless the agglomerating moisture is introduced into the potato solids at an elevated temperature such as 150°–180° F.

If the granules do not include sufficient free starch, a few percent of binder, i.e., preferably about 1 percent to 3 percent by total weight, must also be incorporated with the particles and moisture. Alternatively, the binder can be dispersed as a coating on the agglomerated units or even be incorporated in the rehydration liquid. In any event, the binder is essential to enhance the viscosity of the ultimate dough, thereby improving the quality of the french fries. A suitable mix for extrusion must not have excessive free starch. If ingredients with excessive free starch are used, or if excessive free starch is created during the formation of the dried extruded pieces, a hard nonporous shell is formed which, when reconstituted, forms a lumpy dough.

After ensuring that the mix is of uniform composition, it is formed into units (agglomerates) of agglomerated potato particles. It has been found useful to provide a rotating blade within the extruder between the conventional helical screw and the die head. This appears to reduce the density of the extruded material. The forming step must be done at sufficient pressure to produce units that can be dried and handled without excessive breakage. However, the pressure must be low enough to produce the desired bulk porosity and bulk density. With the equipment employed, suitable extrusion pressures were found to be in the range of less than 10 pounds per square inch when taken just in front of the die plate. Although a wide range of agglomerate sizes and shapes have been found to be useful, a diehead that produces pellets in the range of one-eighth to three-eighths inch in diameter has been found to be especially effective.

A cutting device mounted on the extruder head has been found to be useful for dividing the damp mass of particles into damp "pellets" of suitable length as they are forced from the diehead. Variation in the rotational speed of the cutter produces modifications in the length of the pellets. This in turn produces variations in the bulk density of the dried agglomerates or pellets, i.e., the shorter the pellets, the higher the bulk density of the dried agglomerates. A pellet length in the range of one thirty-second to one-eighth inch has been found to be especially suitable for providing an agglomerate displaying a bulk density in the critical range of 0.25 to 0.50 grams/milliliter.

Once the wet mix has been subjected to extrusion and cutting, the resulting pellets are dried, preferably in a fluid bed dryer having a air-circulation rate of about 150 to 400 feet/minute. The moisture content of the agglomerates is reduced to about 7 percent by total weight, and the agglomerates screened to remove oversized and undersized material which is recycled to the feed hopper. The preferred product is obtained if the particles pass an 8-mesh sieve but are retained on a 20-mesh sieve (U.S. Sieve series), although a broader range is also useful.

The agglomerates are thereafter reconstituted into a doughlike mass, shaped in the conventional french fry form and deep fat fried. An increase in the rehydrating liquid temperature such as from 55° F. to 130° F., produces a corresponding decrease in the time of rehydration. If the rehydration liquid temperature is increased substantially above 130° F., i.e., such as to 160° F. or higher, the resulting french fries are fragile and break excessively during the frying operation.

DESCRIPTION OF THE PREFERRED EMBODIMENTS

The following examples are intended to be representative of the tests conducted to demonstrate the characteristics of agglomerates found to have the properties set forth above. It will be apparent that the details of the examples are not to be regarded as limitations, as they may be varied, as will be understood by one skilled in this art.

EXAMPLE I

A. Agglomeration with 50 Percent water

A uniform dry mix was made by blending the following in a Hobart mixer for about 10 minutes:

| | |
|---|---|
| Potato Granules | 96% by weight |
| Fine Ground Salt | 2% by weight |
| Guar Gum | 2% by weight |

The above mix and metered water at 60° F. were added to the feed end of a continuous dough mixer in such a ratio as to maintain a moisture content of about 50 percent.

The uniform damp mix was continuously discharged into a screw extruder unit equipped with an extrusion plate with ¼-inch circular die openings and external cutoff blades. This unit was adjusted so that a pressure ranging from about 3–10 p.s.i.g. was exerted on the extruder head. It was found that proper extruding pressure could be maintained by controlling mix moisture, rate of extrusion, length of extruding cylinder, and thickness of extruder die plate. If the extrusion pressure is too low, the dried pellet is too fragile and crumbles with handling. If the extrusion pressure is too high for a given set of conditions, the porosity is effected and the water absorption rate falls below the proper range.

The cut extruded pellets were fed continuously into a fluidized air dryer using velocities of 300–400 ft./min. and air temperature of about 170° F. A residence time of less than 20 minutes was required to lower the moisture to about 7 percent. It will be appreciated by one skilled in this art that extruded pellets can, of course, be dried by many other available methods.

The dried product was screened over a 12-mesh screen and the fines were blended in the feed hopper containing the uniform dry mix. The sized pieces riding over the screen had a density of about 0.35 grams/milliliter. The moisture absorption rate of these agglomerates was found to be about 0.3 grams of water per gram of product per second.

When 2.2 parts by weight cold water were added to one part by weight of the agglomerates, the water just covered the agglomerates, and in less than 3 minutes at room temperature, a uniform dough suitable for extruding or otherwise dividing into pieces for deep fat frying was formed with no mixing, stirring, or manipulating being required. The pieces were deep fat fried, 1½ to 2 minutes at about 370° F. The fried product was judged to be excellent in appearance, flavor and texture.

B. Agglomeration with 70 Percent Water

Example IA was repeated using a moisture content of about 70 percent. Only when the moisture input temperature was adjusted to 160°–180° F. was the quality of the resulting french fry dough satisfactory.

C. Agglomeration with 77 Percent Water

Example IA was repeated using a moisture content of 77 percent. Increasing the input temperature of the water to 160°–180° F. and higher did not produce a satisfactory dough.

D. Agglomeration with 30 Percent Water

Example IA was repeated using a moisture content of 30 percent. Decreasing the input temperature of the water to 25°–32 F. produced a quality dough.

Example II

A mixture of 96 parts by weight potato granules, two parts guar gum, and two parts fine salt were added to a fluidized dryer. Sufficient air heated to 160°–170° F. was forced through the mix to fluidize gently. Water was sprayed on the surface of the fluidizing bed at a pressure of 35 p.s.i.g. Small spherical agglomerates were formed and dried quickly to 6–8 percent moisture. The dried product was screened to pass a 6-mesh screen but be retained by a 26-mesh screen. The material passing the 26-mesh screen was utilized by blending with additional mix to bring back to the original weight and repeating the process. The −6+26 agglomerates had a density of about 0.40 g./ml. When these spherical agglomerates were covered by 2.2 parts by weight water, a uniform dough was formed without mixing. The formed pieces were fried for 1½ minutes at about 370° F. The fried product was judged excellent in appearance, flavor, and texture.

EXAMPLE III

Commercial potato flakes were ground to pass a 20-mesh screen. Ninety-six parts by weight were uniformly mixed with two parts guar gum and two parts salt. This mix was fluidized with air at 140° F., while water was sprayed on the fluidizing surface. The agglomerates which formed were then dried to 7 percent moisture. The dried product screened over a 10-mesh standard screen had a density of about 0.35 grams per milliliter. This product was rehydrated by adding 2.3 parts by weight of water to each part by weight product. A uniform dough was formed without mixing. The dough was cut into strips and fried at about 370° F. for 2 minutes. The finished fried product was judged excellent in appearance, flavor, and texture.

What is claimed is:

1. A process for producing agglomerates of dehydrated potato particles that are rapidly reconstitutable into a substantially homogeneous dough in the absence of physical agitation, the resulting rehydrated dough being suitable for shaping into french fried bodies, said process comprising the steps of: mixing dehydrated potato solids, composed at least in part of potato granules, with water and binder in an amount to form a damp cohesive mass; extruding the mass at a pressure of from about 3–10 p.s.i.g. into porous agglomerates; and drying said agglomerates to approximately 7 percent by weight moisture content to produce a product having a bulk density of 0.25–0.5 grams per milliliter, a bulk porosity of 0.6–0.9 and a moisture absorption rate of about 0.12–0.50 grams of water per gram of product per second, while retaining the porous structure of the agglomerates.

2. A process in accordance with claim 1 wherein said moisture absorption rate is in the range of 0.20–0.35 grams of water per gram of product per second.

3. A process for producing agglomerates of dehydrated potato particles that are rapidly reconstitutable into a substantially homogeneous dough in the absence of physical agitation, the resulting rehydrated dough being suitable for shaping into french fried bodies, said process comprising the steps of: mixing binder-containing dehydrated potato solids, composed at least in part of potato granules, with an amount of water sufficient to form a damp cohesive mass, said amount of water being temperature dependent and selected from about 35–55 percent by total weight of water at 60° F., up to about 70 percent by total weight of water in a range of 150°–180° F. and about 30 percent water by total weight in the range of 25°–35° F; extruding the mass at a pressure in the range of 3–10 p.s.i.g. into porous agglomerates; and drying said agglomerates to approximately 7 percent by weight moisture content to produce a product having a bulk density of 0.25–0.5 grams per milliliter, a bulk porosity of 0.6–0.9, and a moisture absorption rate of about 0.12–0.50 grams of water per gram of product per second, while retaining the porous structure of the agglomerates.

* * * * *

UNITED STATES PATENT OFFICE
CERTIFICATE OF CORRECTION

Patent No. 3,622,355            Dated November 23, 1971

Inventor(s) Mounir A. Shatila, Roderick G. Beck

It is certified that error appears in the above-identified patent and that said Letters Patent are hereby corrected as shown below:

Cover sheet, item [72] should read as follows:

--Inventors Mounir A. Shatila;
Roderick G. Beck, both of Blackfoot, Idaho--

Signed and sealed this 2nd day of May 1972.

(SEAL)
Attest:

EDWARD M. FLETCHER, JR.            ROBERT GOTTSCHALK
Attesting Officer                    Commissioner of Patents